United States Patent Office 3,430,390
Patented Mar. 4, 1969

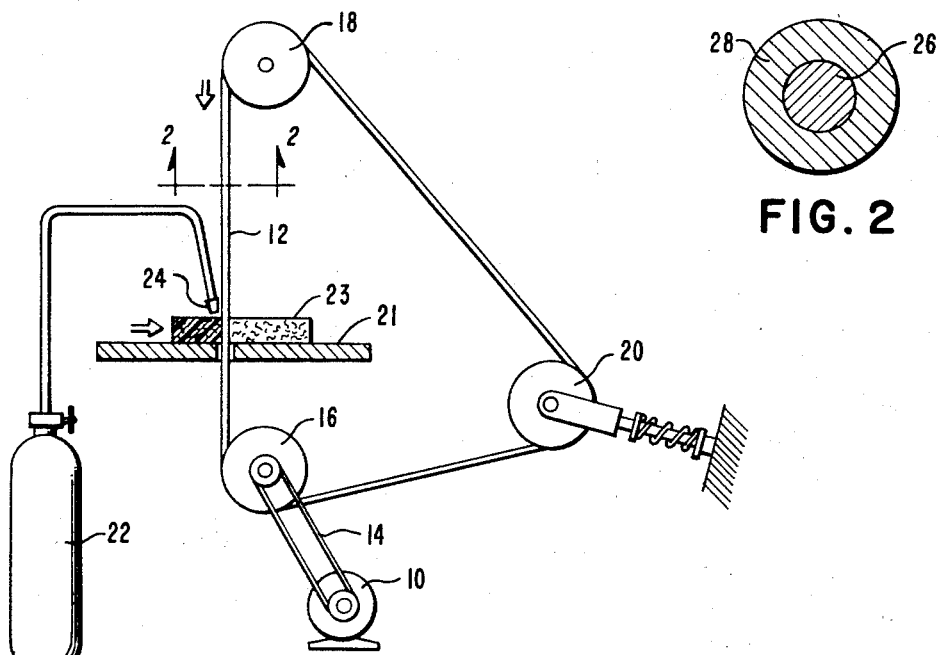
FIG. 1
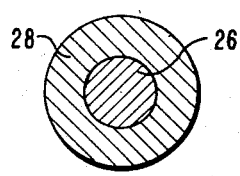
FIG. 2
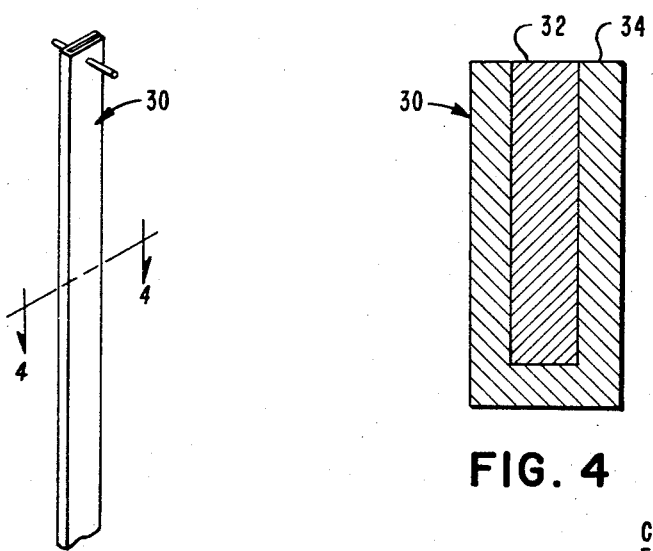
FIG. 3
FIG. 4

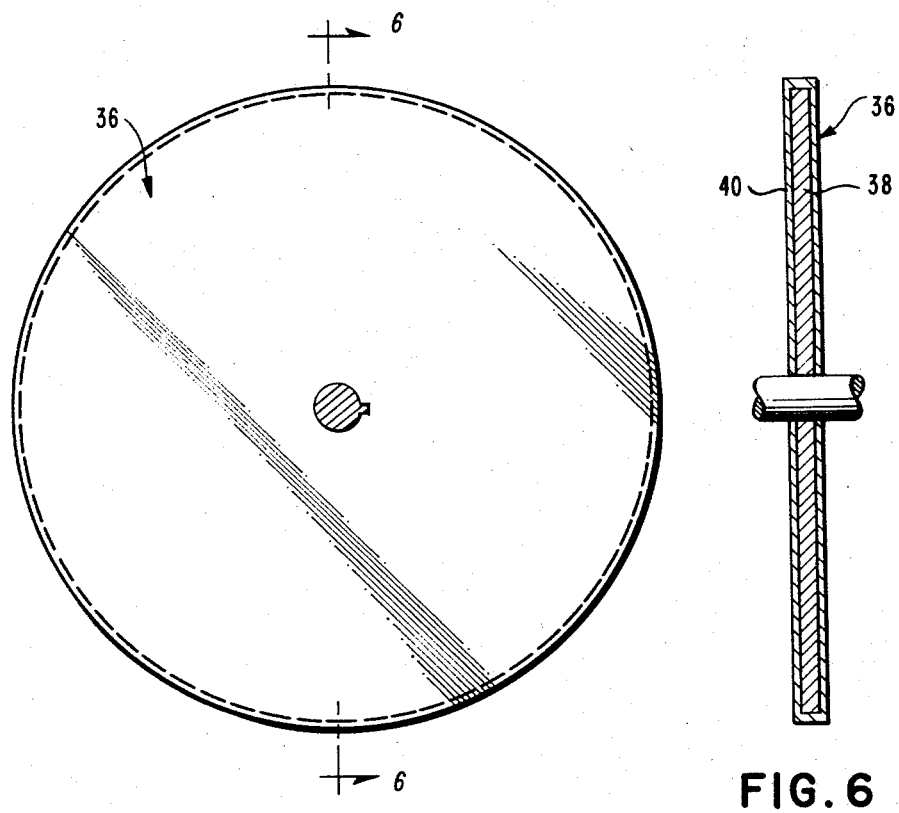
FIG. 5
FIG. 6
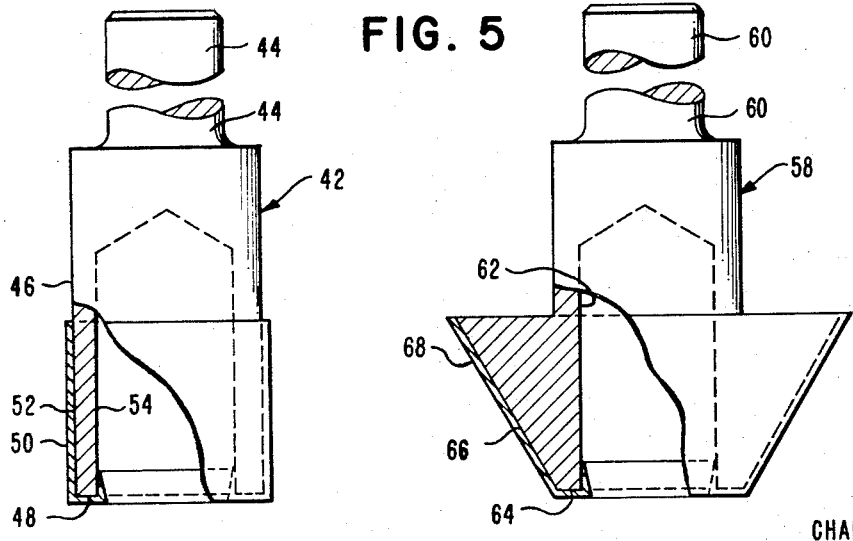
FIG. 7
FIG. 8
INVENTORS
CHARLES E. WOLCOTT
FRANK J. FILIPPI

3,430,390
CUTTING MACHINES AND TOOLS FOR
COMPOSITE MATERIALS
Charles E. Wolcott, El Cajon, and Frank J. Filippi, La
Mesa, Calif., assignors to Whittaker Corporation, a
corporation of California
Filed Dec. 17, 1965, Ser. No. 514,636
U.S. Cl. 51—59                                     3 Claims
Int. Cl. B24b 7/00, 9/00, 21/00

ABSTRACT OF THE DISCLOSURE

Tools for cutting and machining composite materials having at least two components of widely differing hardness are constructed with an inner load bearing member having high tensile strength with a ductile material affixed to cover the work portion of the member and capable of having imbedded on its surface microscopic particles of the harder component in the composite material.

---

This invention relates to tools for cutting and machining composite materials containing two or more material components, and more particularly, to tools for materials having at least two of the components with widely different hardness characteristics.

Certain problems presently exist in cutting or machining composite materials, such as those in which boron filaments are embedded in plastics or other substances having a lower hardness characteristic. Available methods of cutting or machining various materials can be adapted to the physical characteristics of one component or the other, but not both. Presently, the cutting and machining tools and methods used for composite materials are primarily adapted to machine or cut the harder materials.

For economy, any materials should be cut or machined with an even surface and as little loss of materials as possible. Yet one of the primary defects of prior methods has been the bending and shattering, instead of actual cutting or chip erosion of the harder fibers, in composite materials. Specifically, the harder fibers are bent and shattered by diamond cutting tools most often utilized. The relatively coarse and extremely hard diamond particles push the harder components into the more pliable material, causing them to bend and eventually shatter. Microphotographs of composite boron material cut by this means clearly show the shattering of the boron fibers, and this results in a rough irregular surface and considerable loss of material. Additional material is lost when the surface must then be smoothed by grinding or polishing.

Moreover, diamond cutting tools are initially expensive, and during cutting the diamond particles are gradually pried or broken away from the surface to which they are bonded so that eventually the tool must be replaced or its cutting surface replenished with diamond particles.

Modern methods of ultrasonic cutting are ineffective where the material to be cut absorbs the ultrasonic vibrations. With composite materials containing hard fibers embedded in a soft component, the ultrasonic frequencies are transmitted along the length of the hard fibers and absorbed by the softer component of the composite material. Frequently the vibration of the hard fibers causes them to become completely separated from the softer component, and this produces an even more ragged surface than when diamond cutting tools are used.

Another method sometimes used for severing composite materials is pressure erosion. Although pressure erosion successfully cuts both the hard and soft components of composite materials, the violent nature of the cutting action produced by the abrasive particles results in very uneven and ragged surfaces and considerable waste of material.

Spark erosion, another method of machining frequently employed for some materials, cannot be used for composite materials such as those having boron fibers embedded in a plastic binder matrix. Neither the boron fiber, which is essentially a semiconductive coating on a metallic fiber, nor the plastic which is primarily a dielectric, are sufficiently conductive for the spark discharge to have any effect.

Accordingly, it is an object of the present invention to provide a cutting or machining system and apparatus which is capable of severing a material having structural components of widely different hardness qualities to give a smooth surface where the cutting or machining has occurred.

Another object of this invention is to sever or machine a composite material by utilizing the harder component of the material itself as the cutting agent with the cutting agent being continually replaced.

An additional object of the present invention is to cut or machine a composite material with cutting agents smaller in size than prior art cutting agents.

Another object is to machine composite material to produce an extremely smooth surface without a separate polishing action.

Yet another object of the present invention is to provide a cutting or machining tool which requires no special cutting agent such as metal teeth or diamond particles.

Still another object of this invention is to provide a cutting tool which conditions the composite material as it is being cut to enhance the cutting action.

In accordance with one aspect of the present invention there is provided a cutting or machining tool for use on composite materials composed of two or more structural components of widely different hardness characteristics. This tool or utensil has an external surface composed of a ductile metal surrounding an internal core structure having high tensile strength. The core structure provides the load bearing function to establish the necessary strong linkage to the motive power for passing the cutting tool rapidly over the surface of the material to be severed or machined. Microscopic particles of the harder component of the composite material embedded in the ductile surface of the tool serve as the cutting agent. As microscopic particles of the harder component are dislodged from the composite material by the friction of the tool passing along the cutting surface, they become embedded in the ductile material thus providing a continuous replacement of the cutting agent as the particles previously embedded are worn away. With these microscopic particles as the cutting agent, the hard fibers are smoothly cut and are not forced or bent into the more pliable component.

In accordance with another aspect of this invention, the cutting surface is cooled to maintain the more pliable component relatively rigid at a temperature low enough to prevent substantial softening or a tendency to flow due to the heat of friction produced by the cutting or machining operation. Relative rigidity of the more pliable component supports the harder components in place as they are cut and tends to prevent their being forced into the softer components and consequently bent and shattered.

These and other aspects will become apparent from the following detailed description taken in conjunction with the accompanying drawings, in which:

FIG. 1 is a schematic diagram illustrating a system utilizing a loop or band type cutting tool in accordance with the invention for cutting composite materials;

FIG. 2 is an enlarged sectional view of an embodiment of this invention corresponding to the cutting loop used in the system shown in FIG. 1, taken along the line 2—2;

FIG. 3 is a perspective view of an embodiment of the invention in the form of a cutting blade intended for use in jigsaw-type cutting tools;

FIG. 4 is an enlarged full sectional view of the cutting blade of FIG. 3, taken along the line 4—4;

FIG. 5 is a plan elevational view of a circular cutting tool embodiment of the invention;

FIG. 6 is a full sectional view taken along the line 6—6 illustrated in FIG. 5;

FIG. 7 is a side view, with a portion broken away to show a partial section, of a different embodiment of this invention used for cutting holes; and FIG. 8 is a side view, with a portion broken away to show a partial section, of yet another embodiment of the invention used for forming conically shaped holes in composite materials.

Referring now to FIG. 1, which shows schematically a system employing a novel cutting tool for composite materials in accordance with this invention, a source of motive power, in this case a motor drive unit 10, drives a cutter loop 12 through a suitable mechanical linkage. In the particular system illustrated, the driving force and motion is transmitted to the loop 12 from the motor drive unit 10 through a belt 14 and a drive pulley 16. A fixed idler pulley 18 provides support for the cutting loop, and the cutter loop 12 is tensioned over the drive and idler pulleys 16 and 18 by a spring mounted idler pulley 20. The cutter loop 12 passes through an opening in a work surface 21 that supports the composite material 23 during cutting.

FIG. 1 is a simplified sketch of a system employing the novel cutting and machining tool of this invention. Modifications and different arrangements of the requisite elements of the machining system to meet specific cutting or machining requirements may be devised as necessary. When the composite material to be cut has a bonding agent or matrix, such as a polymer, holding the harder components or fibers in place, this material may soften due to the heat caused by friction of the cutting or machining. As a result, the material may become too pliable for effective cutting or machining. To avoid heat softening, the material can be cooled while being cut or machined. This cooling is most readily accomplished by directing a jet of low temperature gas from a pressurized source 22 through a nozzle 24 along the cutting loop 12 where it bears against the material. The cooling gas reduces the temperature of the material at the cutting surface and also that of the tool as it cuts the material. In most instances, a jet of bottled carbon dioxide gas at a point close to the cutting surface provides the requisite cooling effect, but any suitable cooling gas can be used. Alternatively, it might be preferable to cool the entire piece of material to such a low temperature that the softer material cannot become too pliable.

Referring now to FIG. 2, which illustrates an enlarged section of the cutter loop 12 utilized in FIG. 1, a core 26 of flexible material having high tensile strength, such as a steel wire or cable, is sheathed with a layer of ductile material 28 having a lesser hardness than the core, but sufficiently hard to allow embedding and holding of the cutting particles of the harder component of the composite material. The core 26 has high tensile strength and acts as a load bearing member in order to allow the necessary motive power to be transmitted to the cutting tool. Cutting tools in accordance with the invention do not require any additional abrasive particles or special cutting surfaces in order to accomplish its cutting action efficiently since the cutting agent is obtained from the material being cut.

The invention may be implemented in various forms. FIGS. 3 and 4 illustrate a blade type cutting tool 30 in accordance with the invention suitable for use in jigsaws, hacksaws and similar cutting tools having an oscillatory cutting motion, rather than the continuous motion of the cutting loop. As shown in FIG. 4, the cutting blade 30 has a high tensile strength core 32 sheathed with a ductile metal 34 over its entire surface, or at least covered on the edge intended to bear against the composite material during cutting.

FIGS. 5 and 6 show a circular machine tool 36 in accordance with the invention wherein an annular high tensile strength core 38 is covered on its outer surfaces with a ductile metal 40. The circular machine tool 36 serves either as a cutter at its periphery or as a grinding wheel on which the microscope particles of the harder component of the composite material are picked up across the flat face of the tool.

The embodiment of the invention illustrated in FIG. 7 is a tool 42 for cutting holes in composite materials. The holing tool 42 has a high tensile strength core with a solid shank 44 at one end that can be held in a chuck or arbor fitting and an open hollow tubular section 46 at the other end. The flat annular surface 48 at the tip surrounding the open end is covered with a layer 50 of ductile metal to form the cutting surface. The tool 42 is rotated about its longitudinal axis with the cutting surface against the composite material to cut a circular groove. When the circular groove has been cut through the composite material, the tool 42 is withdrawn leaving the hole.

As shown in FIG. 7, the ductile material layer 50 also overlies the outer radial surface 52 of the tubular section 46 along a substantial portion of its axial length to polish the inner surfaces surrounding the hole as it is being cut. The ductile material layer 50 covers only a small portion at the tip of the inner radial surface 54 merely to prevent contact between the core and the composite material being cut. This is done because the circular piece cut out to form the hole is normally discarded and thus does not need a polished surface. The resulting lack of substantial frictional contact with the composite material along the inner surface 54 of the tool 42 reduces the power needed to overcome frictional drag in cutting the hole.

On the other hand, if the holing tool 42 is to be used for cutting out smooth cylindrical plugs from the piece of composite material, rather than cutting smooth holes, then the ductile material layer 50 can be applied to the inner radial surfaces 54 along a substantial portion of its axial length, with only a small portion at the tip of the outer radial surface 54 being covered. Similarly, other embodiments of this invention may be designed with the ductile material layer applied to the cutting surface and only one side surface of the cutting tool where a polished surface is desired on only one side of the cut being made, thus minimizing the power required to overcome the frictional drag between the tool and the composite material being cut.

Tools in accordance with the invention can be designed to perform various grinding operations for machining composite materials. Referring now to FIG. 8, a tool 58 is shown that provides a combination cutting and grinding action to form holes having conically shaped inner surfaces in composite materials. The tool 58 is similar to that shown in FIG. 7 in that it has a high tensile strength core consisting of an upper shank portion 60 at one end to be held in a chuck or arbor with a hollow cylindrical opening 62 at the other end, and the tool 58 is rotated about its longitudinal axis to cut a circular groove in the composite material. The outer surfaces of the core adjacent the tip are however flared outward at an acute angle to the flat annular surface 64 at the tip to provide a conically shaped grinding surface 66. A layer of ductile material 68 overlies the flat annular surface 64 at the tip to from the cutting surface, and also covers the outer conically shaped surface 66 which serves to grind the inner surfaces of the hole made into a conical shape as the tip cuts through the material.

It should be recognized that tools in accordance with this invention can be designed to perform many different cutting or machining functions for composite materials having components with different degrees of hardness. Various ductile materials can be used to cover the high tensile strength cores depending upon the degree of hardness exhibited by the harder component of the composite material. For example, for a composite material having boron fibers embedded in a plastic matrix, the ductile material layer is preferably bronze overlying a high tensile strength core of steel. Brass and iron are also suitable in most cases. However copper tends to wear off on the hard boron fibers and results in a copper-to-copper bearing surface. The ductile material layers may be fastened, bonded or otherwise affixed to the high tensile strength core as required by the nature of the material used. In most cases tool speeds in the order of 200 feet per minute at the cutting surfaces provide smooth, rapid operation. Boron fiber and plastic composite materials cut or machined by tools in accordance with this invention characteristically exhibit a smoothness along the cut or machined surfaces approximately eight times that achieved by the best diamond cutting and machine tools previously used.

Although particular cutting and machine tools and systems have been described and illustrated herein by way of example to explain the nature and various aspects of the invention, it will be appreciated by those skilled in the art that various modifications, changes and variations in details and form may be made by those skilled in the art without departing from the spirit and scope of the invention as expressed in the appended claims.

What is claimed is:

1. A system for machining composite materials having harder fibers imbedded in a plastic matrix comprising: a source of motive power; a machining tool comprising an inner element and an outer element, said inner element being the structural load bearing element and having high tensile strength and said outer element having a smooth surface and being of ductile material covering said inner element over at least a work portion; and means for coupling said source of motive power to drive said machining tool with the covered work portion in contact with the composite material.

2. A system in accordance with claim 1 wherein said ductile material is of sufficient ductility that small particles of the harder fibers of the composite material are embedded in said ductile material to form a cutting agent for said tool.

3. A machining system in accordance with claim 1 further comprising means for selectively maintaining the temperature of the composite material at the cutting surface below a predetermined temperature to prevent the plastic matrix from becoming too pliable for machining.

References Cited

UNITED STATES PATENTS

| | | | |
|---|---|---|---|
| 379,835 | 3/1888 | Turrettini | 125—21 |
| 1,982,710 | 12/1934 | Tone | 51—206 |
| 2,446,817 | 8/1948 | Feiler | 51—206 |
| 2,562,587 | 7/1951 | Swearingen. | |
| 2,793,478 | 5/1957 | Rohowetz. | |
| 2,994,314 | 8/1961 | Wayland | 125—21 |
| 3,106,319 | 10/1963 | Fischer | 51—206 X |

LESTER M. SWINGLE, *Primary Examiner.*

D. G. KELLY, *Assistant Examiner.*

U.S. Cl. X.R.

51—72, 109, 148, 267, 394